(12) United States Patent
Izumi et al.

(10) Patent No.: US 6,195,642 B1
(45) Date of Patent: Feb. 27, 2001

(54) DIGITAL BROADCASTING RECEIVING APPARATUS

(75) Inventors: Shinobu Izumi, Saitama; Jun Maruo; Tatsushi Banba, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/057,532

(22) Filed: Apr. 9, 1998

(30) Foreign Application Priority Data

Apr. 15, 1997 (JP) .................................................. 9-097474

(51) Int. Cl.[7] .............................. H04N 7/173; H04N 7/00
(52) U.S. Cl. .................................. 705/1; 705/1; 370/485; 370/487; 370/522; 370/535; 370/537; 370/490; 348/2; 348/6; 348/7; 348/17; 455/5.1; 455/454; 455/414; 455/462; 455/463; 343/895; 343/702
(58) Field of Search ................................. 705/1; 370/487, 370/522, 485, 523, 535, 537, 490; 348/6, 7, 12; 455/511, 63, 414, 462, 463, 464, 411; 343/895, 702

(56) References Cited

U.S. PATENT DOCUMENTS

| 5,375,163 | * | 12/1994 | Kumimoto et al. | ................. | 455/464 |
| 5,687,218 | * | 11/1997 | Nakayama | ............................ | 455/415 |
| 5,757,336 | * | 5/1998 | Matsuoka | .............................. | 343/895 |
| 5,784,683 | * | 7/1998 | Sistanizadeh | ........................ | 370/487 |
| 5,805,998 | * | 9/1998 | Kodama | ................................. | 455/462 |
| 5,812,543 | * | 9/1998 | Sugita | ..................................... | 370/335 |
| 5,822,324 | * | 10/1998 | Kostresti et al. | .................... | 370/487 |
| 5,953,670 | * | 9/1999 | Newson | ................................ | 455/454 |

* cited by examiner

Primary Examiner—James P. Trammell
Assistant Examiner—Nga B. Nguyen
(74) Attorney, Agent, or Firm—Jay H. Maioli

(57) ABSTRACT

A digital broadcasting receiving apparatus that can be installed without regard to the location of the telephone outlet where a signal is received by a front-end, reception data is decoded by an A/V decoder, and a video signal and an audio signal are outputted from a D/A converter. Monitor information has been stored in an IC card and is periodically read into a memory by a CPU. Further, the monitor information is transmitted from the memory to a management system by the control of the CPU through a telephone line. A modem and a slave module of a cordless telephone are connected. The monitor information is transmitted between the slave module and an external master unit in a wireless manner. The monitor information is transmitted from the master unit to the management system through the telephone line.

9 Claims, 3 Drawing Sheets

DIGITAL BROADCASTING RECEIVING APPARATUS

BACKGROUND OF THE INVENTION

1. Field of the Invention

The invention relates to a digital broadcasting receiving apparatus which can be applied to a receiving apparatus of a toll broadcasting such as a digital satellite broadcasting or the like.

2. Description of the Related Art

In recent years, a digital broadcasting system for transmitting multimedia data such as image signal, audio signal, and the like by using a communicating satellite has been being put into practical use. The present invention can be applied to a receiving apparatus of such as a digital broadcasting system. In FIG. 1, reference numeral 1 denotes a whole conventional receiving apparatus of a digital satellite broadcasting.

In FIG. 1, a receiving antenna 2 receives a radio wave from a communicating satellite (or broadcasting satellite). A converter annexed to the antenna 2 down-converts a reception signal to an IF (intermediate frequency) signal of a predetermined frequency and outputs the converted signal to a front-end 3. Although not shown, the front-end 3 is constructed by a tuner, a demodulating circuit, and an error correcting circuit. A desired transponder is selected by the tuner in the front-end 3. A signal from the selected transponder is QPSK (Quadrature Phase Shift Keying) demodulated by the demodulating circuit and is, further, error correction processed by the error correcting circuit, so that a transport stream output is derived. The error corrected output (transport stream) is supplied to a descrambling unit 4. A descrambling process for cancelling the scramble is performed in the descrambling unit 4.

A transport stream of MPEG2 (Moving Picture Experts Group) is obtained as an output of the descrambling unit 4 and is supplied to a demultiplexer 5. In the demultiplexer 5, a packet of a desired program is separated from the transport stream and video data, audio data, and control data are separated on the basis of information in a header portion. A memory 6 is provided so as to be used for a process of the demultiplexer.

The video/audio data from the demultiplexer 5 is decoded by an audio/video decoding unit (A/V decoder) 7 and reception video/audio signals are formed. The A/V decoder 7 is a decoder of MPEG2 and a memory 8 is provided in association with a process of the A/V decoder 7. The decoded video/audio signals are converted into analog video/audio signals by a D/A converter 9 and are outputted. An output video signal is supplied to a display and a reception video image is displayed. The output audio signal is amplified by, for example, an amplifier and is reproduced by a speaker.

The control data separated by the demultiplexer 5 is supplied to a CPU 10 serving as an equipment control unit. A memory 11 is provided in association with the CPU 10. Further, an interface unit 12 is connected to the CPU 10. A remote control signal receiving unit 13, a front panel 14 equipped with operation keys and the like, and an IC card (security module) 15 are connected to the CPU 10 through the interface unit 12. The CPU 10 reads out programs from the memory 11 and controls the operation of the receiving apparatus. The CPU 10 executes the control of the front-end 3, descrambling unit 4, demultiplexer 5, and an A/V decoder 7, reception of commands from the remote control signal receiving unit 13, display on the front panel 14, and reception of the button. As mentioned above, the CPU executes the control of the receiving apparatus.

A modem 16 is connected through the interface unit 12. The modem 16 and a modular jack 17 are connected. The modular jack 17 is provided on the rear panel of the receiving apparatus 1. The modular jack 17 and a telephone line service entrance 18 are connected by a cable. The modem 16 is used to transmit viewer information (accounting information and the like) stored in the IC card 15 through a telephone line. That is, monitor history information such as an accumulated amount of money and the like in the case where the viewer monitors a pay-per-view program is stored in the IC card 15. When the accumulated money amount reaches a preset upper limit value or periodically, the monitor history information which is read out from the IC card 15 is transmitted to a management system via the modem 16.

Ordinarily, at home, in many cases, there is one service entrance of the telephone line and the service entrance is away from the installing location of the receiving apparatus of the foregoing digital satellite broadcasting. It is, therefore, necessary to place an extension cable and to connect the modular jack 17 of the receiving apparatus and the service entrance 18. In the case where, on the other hand, there is a service entrance at the first floor of a home and the user wants to install the receiving apparatus on the second floor, since the extension cable becomes too long, it is necessary to perform a construction to install one more telephone line service entrance on the wall of the second floor.

OBJECTS AND SUMMARY OF THE INVENTION

It is, therefore, an object of the invention to provide a digital broadcasting receiving apparatus which can be installed in a location independent of the position of a service entrance of a telephone line.

To solve the above problems, according to the invention, there is provided a digital broadcasting receiving apparatus for receiving multiplexed digital data, comprising:

means for receiving a digital broadcasting radio wave and generating reception data;

decoding means for decoding video/audio information from the reception data;

output means for extracting the video/audio information to the outside;

control means to which a memory and operating means are connected and which controls the operation of an equipment; and means for transmitting monitor information from the control means by a wireless manner to an external equipment connected to a telephone transmitting path.

According to the invention, there is also provided a digital broadcasting receiving apparatus for receiving multiplexed digital data, comprising:

means for receiving a digital broadcasting radio wave and generating reception data;

decoding means for decoding video/audio information from the reception data;

output means for extracting the video/audio information to the outside;

control means to which a memory and operating means are connected and which controls the operation of an equipment;

means for transmitting monitor information from the control means by a wireless manner; and an external equipment for receiving the monitor information and transmitting it to a management system through a telephone line.

According to the invention, the monitor information which needs to be transmitted to the management system can be transmitted by a wireless manner. Therefore, it is possible to prevent the installing location of the receiving apparatus from being restricted.

The above and other objects and features of the present invention will become apparent from the following detailed description and the appended claims with reference to the accompanying drawings.

DETAILED DESCRIPTION OF THE PREFERRED EMBODIMENT

Figure 1:
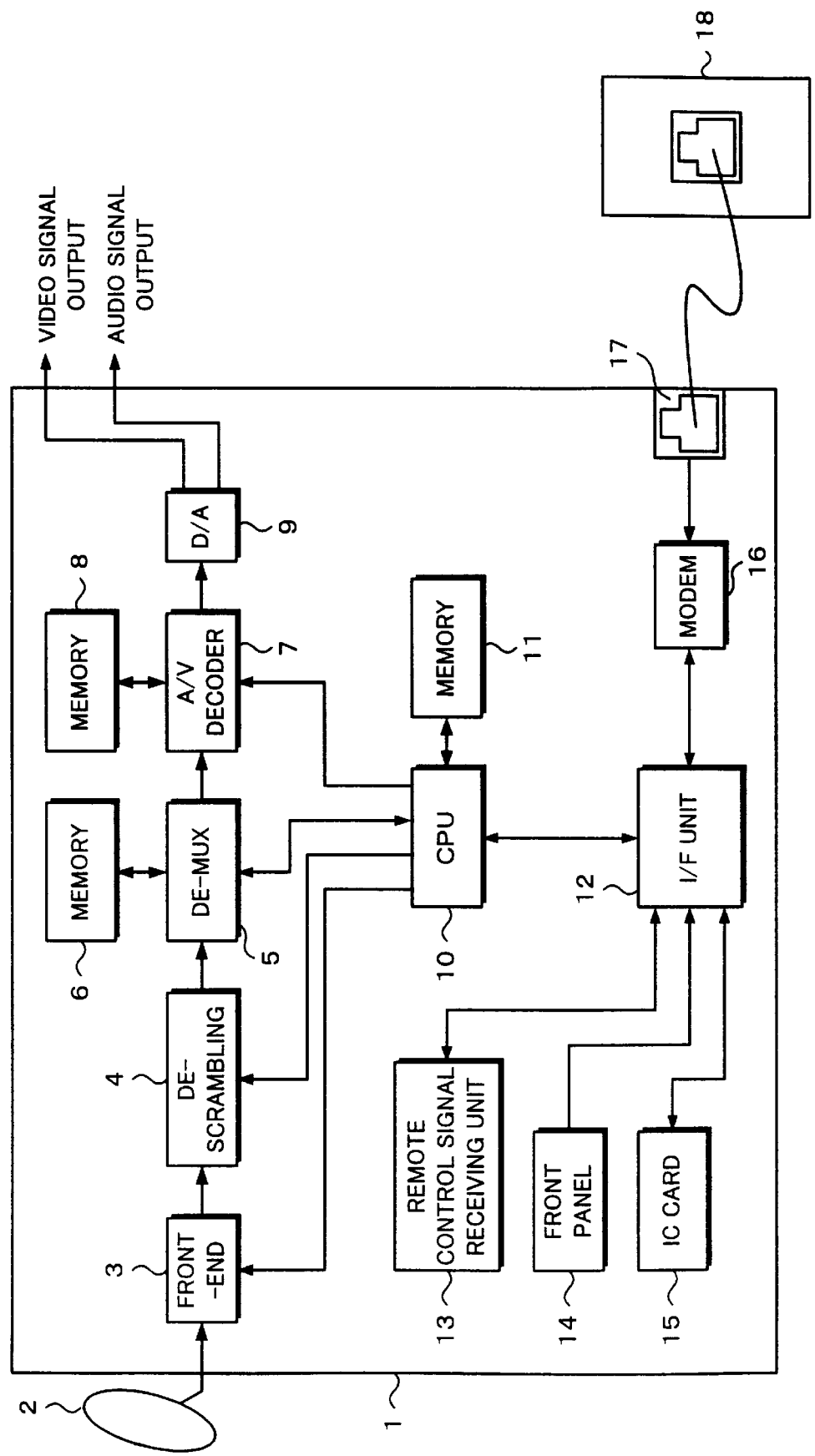
FIG. 1 is a block diagram of an example of a conventional satellite broadcasting receiving apparatus.
Figure 2:
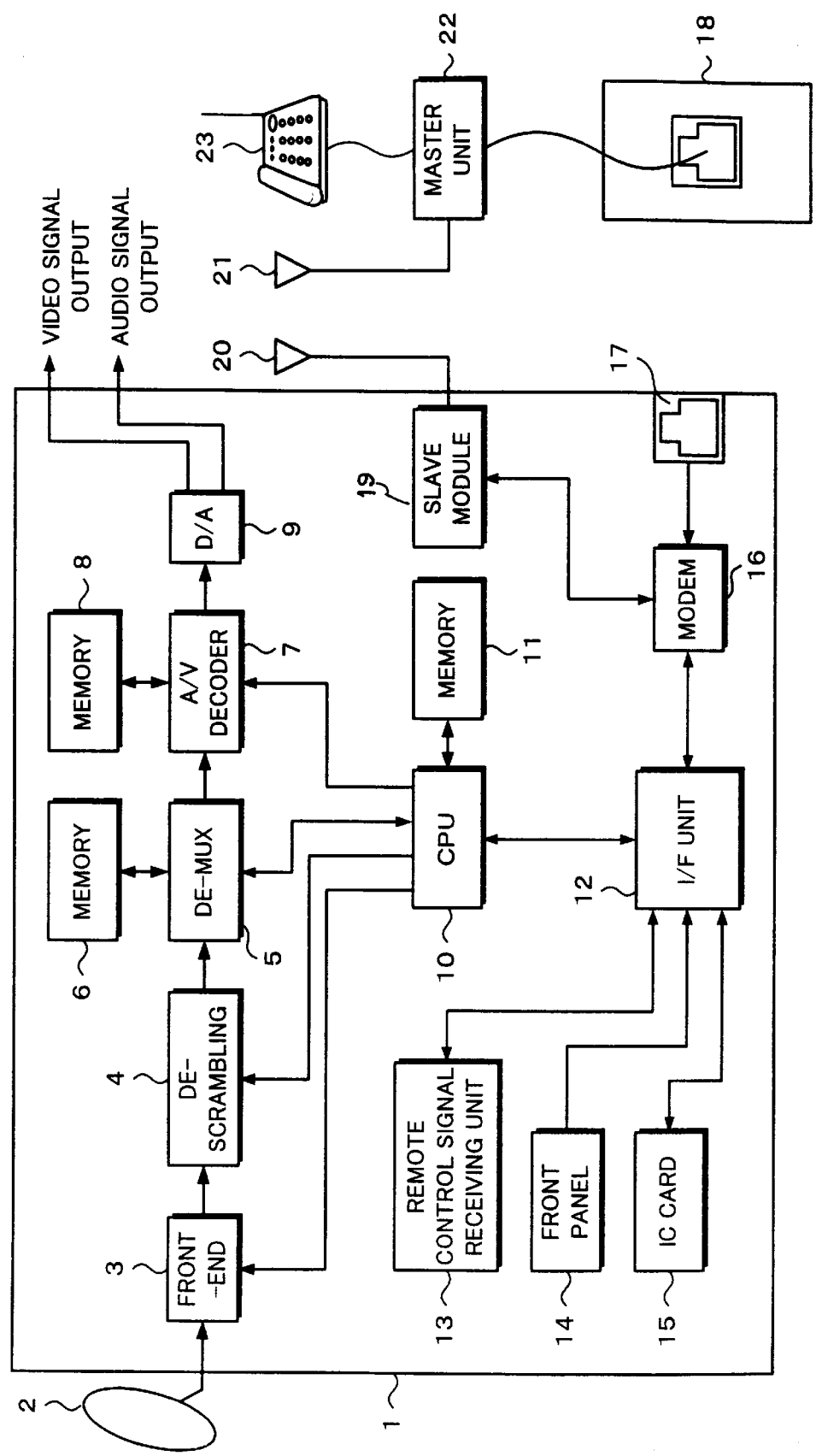
FIG. 2 is a block diagram showing a construction of an embodiment of the invention.

An embodiment of the invention will now be described hereinbelow with reference to the drawings. FIG. 2 shows an embodiment of the invention. Reference numeral 100 denotes a whole receiving apparatus according to the invention. The receiving apparatus will be described hereinbelow while including the overlapped portions with those of the conventional receiving apparatus shown in FIG. 1.

A radio wave from a communicating satellite (or broadcasting satellite) is received by the receiving antenna 2. An IF (intermediate frequency) signal of a predetermined frequency formed by a converter annexed to the antenna 2 is generated from the front-end 3. Although not shown, the front-end 3 is constructed by a tuner, a demodulating circuit, and an error correcting circuit. A desired transponder is selected by the tuner in the front-end 3. A signal from the selected transponder is QPSK (Quadrature Phase Shift Keying) demodulated by the demodulating circuit and is, further, error correction processed by the error correcting circuit, so that a transport stream output is derived. The error corrected output (transport stream) is supplied to the descrambling unit 4. A scrambling of the transport stream is descrambled. The scrambling process is necessary to realize a conditional access which is used to control the discrimination about the permission or inhibition of the program viewing for every viewer. For example, a contract of pay-per-view such that the user views only a certain program for pay each time can be realized. A key to descramble has been inserted as one of packets into the transport stream in a manner similar to the video/audio information.

A transport stream of MPEG2 is obtained as an output of the descrambling unit 4 and is supplied to a demultiplexer 5. In the demultiplexer 5, a packet of a desired program is separated from the transport stream and video data, audio data, and control data are separated on the basis of information in a header portion of each packet. The key for descrambling mentioned above is included in the control data. The memory 6 is provided in association with the process of the demultiplexer 5.

The video/audio data separated by the demultiplexer 5 is decoded by the audio/video decoding unit (A/V decoder) 7 and reception video/audio signals are formed. The A/V decoder 7 is a decoder of MPEG2 and the memory 8 is provided in association with the process of the A/V decoder 7. The decoded video/audio signals are converted into analog video/audio signals by the D/A converter 9 and are outputted. An output video signal is supplied to a display (CRT) and a reception video image is displayed. The output audio signal is amplified by, for example, an amplifier and is reproduced by a speaker. A display signal is superimposed to the video signal and a numeral or the like of a reception channel is displayed on the screen of the display.

The control data separated by the demultiplexer 5 is supplied to the CPU 10 serving as an equipment control unit. As a memory 11 connected to the CPU 10, a flash memory in which a program for an ordinary operation control has been stored, a ROM, a RAM which is used as a temporary storing unit when the flash memory is rewritten or data from the IC card is read, or the like is included. A program for an equipment control is transmitted by a digital broadcasting radio wave and the program in the flash memory can be rewritten by a loader in the ROM. Further, the interface unit 12 is connected to the CPU 10.

The remote control signal receiving unit 13 for receiving a remote control signal by infrared rays, the front panel 14 equipped with operation keys and the like, and the IC card (security module) 15 are connected to the CPU 10 through the interface unit 12. The CPU 10 reads out the programs from the memory 11 and controls the operation of the receiving apparatus. The CPU 10 executes the control of the front-end 3 and demultiplexer 5, reception of commands from the remote control signal receiving unit 13, display on the front panel 14, and reception of the button.

The modem 16 is connected through the interface unit 12. A modem having a speed of, for example, 2400 bps (or 1200 bps) is used as a modem 16. The modem 16 and modular jack 17 provided on the rear panel are connected. The modular jack 17 and telephone line service entrance 18 can be connected by a cable. The modem 16 is provided to perform a two-way communication with a customer management system through the telephone line.

Monitor history information such as an accumulated amount of money and the like in the case where the viewer monitors a pay-per-view program is stored in the IC card 15. When the accumulated money amount reaches the preset upper limit value or periodically, the monitor history information which is read out from the IC card 15 is transmitted to an external accounting management system via the modem 16. A telephone number of the accounting management system is designated by, for example, control data which is broadcasted together with the video data and audio data and a telephone number of an up-link destination is set for every receiving apparatus. In the up-linking process, first, data is read out from the IC card 15 and is loaded into the CPU 10 and, subsequently, a communication is performed between the CPU 10 and the accounting management system through the modem 16 and telephone line.

The CPU 10 periodically sends a command to confirm the up-link to the IC card 15. The IC card 15 responds to the up-link confirmation command, so that the data such as telephone number of the accounting management system, IC card authorization information, monitor history information, and the like is transferred from the IC card 15 to the CPU 1. By controlling the modem, the CPU 10 calls the accounting management system, transmits a password, and receives a password from the accounting management system. The CPU 10 transmits the monitor history information data to the accounting management system. When the transmission is finished, the line is disconnected. The signal which is transmitted and received between the receiving apparatus and the accounting management system is a signal modulated by the hexadecimal value QAM (Quadrature Amplitude Modulation). All of the data is encrypted for security.

In the case where the modular jack 17 and telephone line service entrance 18 are connected by the cable, the monitor information is transmitted by a wire method in a manner similar to the conventional receiving apparatus. In the invention, as will be explained hereinafter, the monitor information can be transmitted in a wireless manner. FIG. 2 shows an example of transmitting and receiving the monitor information in a wireless manner.

The monitor control in a toll broadcasting system is performed by a scramble authorization system. In this system, individual information (EMM: Entitlement Management Message) that is formed on the transmission side and is peculiar to the receiving terminal is sent to the viewer together with the video and audio data. On the receiving terminal, the encryption of the EMM of the same ID as the own ID is decrypted and a work key in the EMM is loaded into the IC card. Information of the telephone number serving as a foregoing up-link destination of the management system is also included in the EMM. A key to decode the EMM is an individual key for each receiving terminal and has previously been stored in the IC card 15.

In addition to the work key and the telephone number, a contracted channel ID and a contract type (provisional contract, pay-per-view, etc.) are included in the EMM.

When a program is monitored, common information (ECM: Entitlement Control Message) that is accompanied in the program and is common to the receiving terminals is read out and loaded into the IC card 15. If the work key corresponding to the channel has previously been stored, the descrambling process is executed and the program can be monitored. The individual information and common information (hereinafter, referred to as an ECM) are transmitted in a form of a packet of the transport stream of MPEG2 in a manner similar to the video/audio data. In case of the pay-per-view, as mentioned above, the monitor history information is periodically up-loaded through the telephone line.

According to the embodiment of the invention, a slave module 19 of an analog cordless telephone is connected to the modem 16. An antenna 20 for the analog cordless telephone is connected to the slave module 19. An antenna 21 and a master unit 22 of the analog cordless telephone are installed within a radio wave reception range of the analog cordless telephone. The radio wave is transmitted and received among the master unit 22, antennas 20 and 21, and slave module 19. Since the master unit 22 does not have functions of dialing, speech communication, and the like as an ordinary telephone, an ordinary (not a cordless telephone) telephone 23 is connected to the master unit 22 as necessary. The master unit 22 and telephone line service entrance 18 are connected by a cable.

Figure 3:
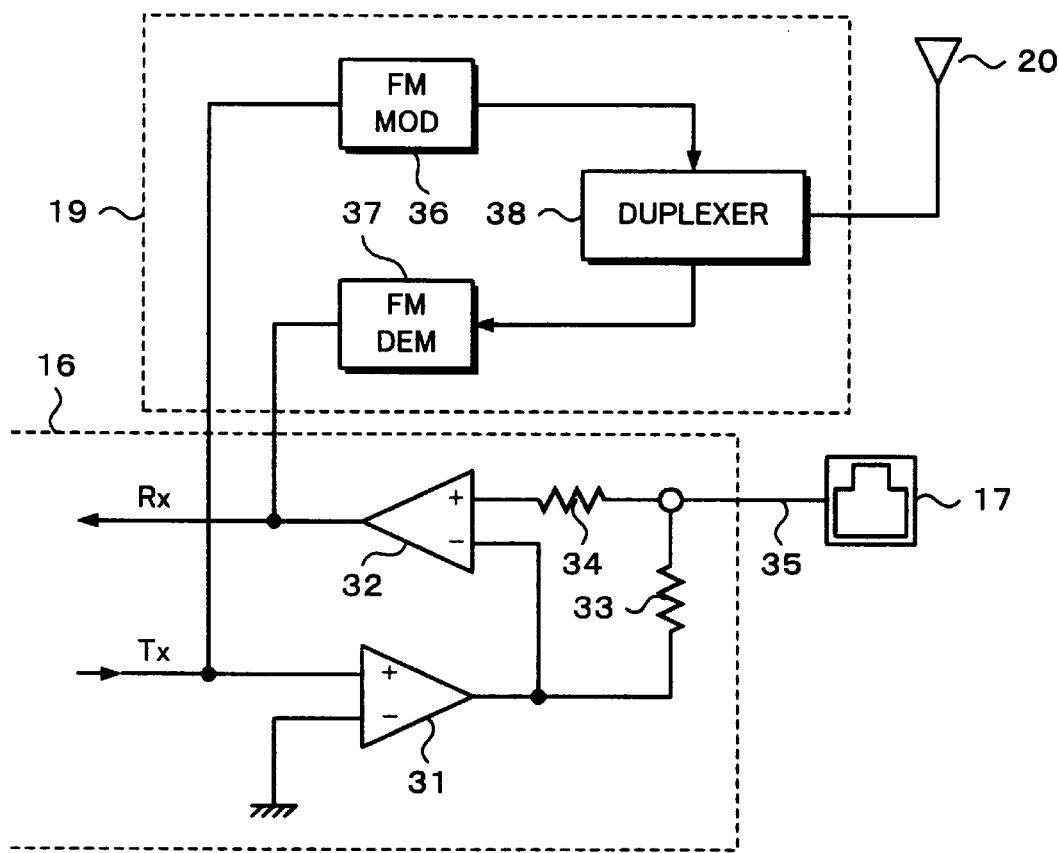
FIG. 3 is a partial connection diagram of a modem and a slave module in the embodiment of the invention.

A partial specific connection between the modem 16 and slave module 19 is shown in FIG. 3. A hybrid circuit comprising operational amplifiers 31 and 32 and resistors 33 and 34 is provided on the line input/output side of the modem 16. A transmission signal Tx generated from the modulation side of the modem is supplied to a non-inverting input terminal of the operational amplifier 31 and its inverting input terminal is connected to the ground. An output terminal of the operational amplifier 31 and an inverting input terminal of the operational amplifier 32 are connected. The output terminal of the operational amplifier 31 and a non-inverting input terminal of the operational amplifier 32 are connected through the resistors 33 and 34. A node of the resistors 33 and 34 is connected to the modular jack 17 through a line 35. Further, an output of the operational amplifier 32 is supplied as a reception signal Rx to the demodulation side of the modem 16.

The transmission signal Tx from the modulation side is transmitted to the telephone line by the hybrid circuit through the line 35 and modular jack 17, and the reception signal Rx can be also supplied to the demodulation side from the telephone line through the modular jack 17 and line 35. The transmission signal Tx and reception signal Rx are, for example, signals obtained by modulating monitor information (digital data) by the hexadecimal value QAM. The hexadecimal value QAM is a modulating system for transmitting data of four bits (hexadecimal value) by setting amplitudes of two carrier waves which perpendicularly cross at four stages. The hexadecimal value QAM is an example of the modulating system and another modulating system such as QPSK or the like can be also used.

Frequencies of the signals (Tx, Rx) modulated by the hexadecimal value QAM from the modem are distributed in an audio band (for example, range from 300 Hz to 3 kHz) which is used in the analog cordless telephone. Therefore, the modulated signal is regarded as an audio signal and can be transmitted and received by the analog cordless telephone.

As shown in FIG. 3, the slave module 19 is constructed by a frequency modulator 36 for frequency modulating the transmission signal Tx, a frequency demodulator 37 for frequency demodulating the reception signal, a duplexer 38, and a microcomputer for control (not shown). The frequency modulator 36 and frequency demodulator 37 have a construction using a PLL and execute a frequency modulation and a frequency demodulation of predetermined carrier frequencies, respectively. The duplexer 38 is constructed by a buffer amplifier, a band pass filter, and the like, transmits the modulated signal from the frequency modulator 36 through the antenna 20, and supplies the modulated signal from the antenna 20 to the frequency demodulator 37. A frequency modulator and a frequency demodulator are also provided for the master unit 22. The data modulated by the hexadecimal value QAM is transmitted to the telephone line connected to the master unit 22.

Figure 4:
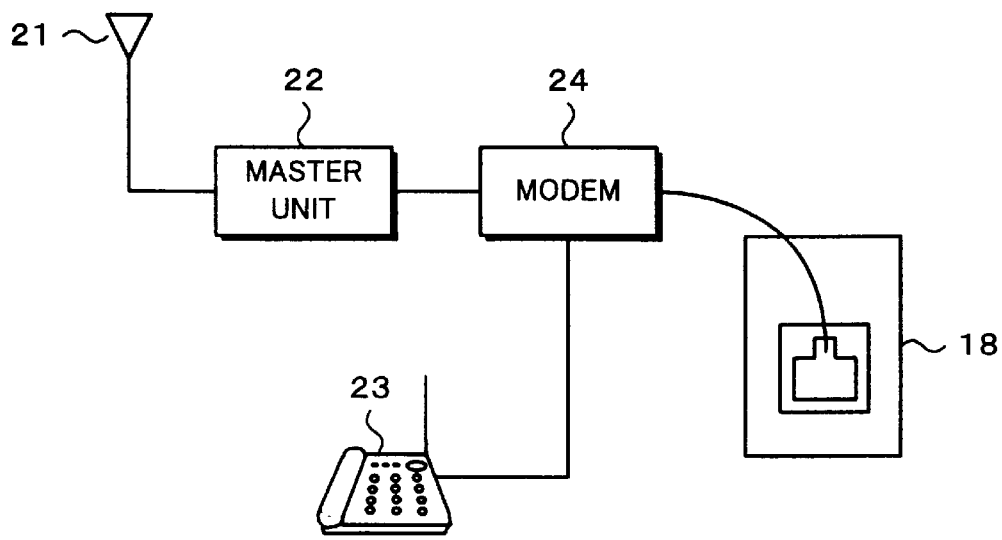
FIG. 4 is a block diagram for explaining a modification of the invention.

FIG. 4 shows an example in which the invention is applied to a case where the monitor information itself lies within a frequency range where it can be transmitted by the digital cordless telephone. In this case, the modem 16 is not provided for a receiving apparatus and the monitor information itself which is outputted from the IC card 15 through the I/F unit 12 is transmitted and received between the slave module 19 and antenna 20 of the digital cordless telephone and the antenna 21 and master unit 22 side. A modem 24 is connected to the master unit 22 and the modem 24 is connected to the telephone line service entrance 18. The monitor information is transmitted between the slave module 19 and master unit 22 by using a predetermined digital modulation. In the master unit 22, the monitor information which was modulated and transmitted is demodulated and the demodulated monitor information is outputted to the modem 24. The monitor information is modulated by the modem 24 by a modulating system different from the modulating system used for transmission between the slave module 19 and master unit 22, for example, by the hexadecimal value QAM. The ordinary telephone 23 is connected to the modem 24 and can be switched so that the ordinary telephone can be used.

The slave module 19 can be also provided out of the receiver instead of providing in the receiver. Further, the function as a telephone can be also provided for the slave module 19 by adding a dialing function, a speaker, a microphone, and the like thereto. The modem 24 can be omitted by making the modulating system between the slave module 19 and master unit 22 of the digital cordless telephone coincide with the modulating system in the modem 24.

According to the embodiment of the invention as mentioned above, the monitor information can be transmitted by a wireless manner by using the digital cordless telephone. In place of the digital cordless telephone, a digital cellular phone, a digital simple mobile telephone [what is called a PHS (Personal Handyphone System)], or the like can be also used. In case of the digital cellular phone or a digital simple mobile telephone, a modulating system such as CDMA (Code Division Multiple Access) or TDMA (Time Division Multiple Access) is used. In this case, the modem 16 of the receiving apparatus 1 can be omitted as mentioned above.

Further, although the embodiment has been described with respect to an example of transmitting the video/audio data through the broadcasting wave, only one of the video data and the audio data can be also transmitted. Data of computer programs can be also transmitted without limiting to the video/audio data.

According to the invention as described above, since the receiving apparatus and the telephone line service entrance can be connected in a wireless manner, when the receiver and a television receiver are installed, arbitrary installing locations can be selected without regard to the position of the telephone line service entrance. Therefore, the troublesomeness and costs which are required for the installation of an extended cable and one more telephone line service entrance can be reduced.

The present invention is not limited to the foregoing embodiments but many modifications and variations are possible within the spirit and scope of the appended claims of the invention.

What is claimed is:

1. A digital broadcasting receiving apparatus for receiving a broadcasting signal including a pay-per-view program, comprising:

storing means for storing information regarding a viewing history of said pay-per-view program; and transmitting means including an interface unit connected to said storing means, a modem connected to said interface unit, a slave module of an analog cordless telephone connected to said modem, and a first antenna connected to said slave module for transmitting in a wireless manner said viewing history information stored in said storing means to a transceiver including a master unit of the analog cordless telephone connected to a public telephone line and a second antenna connected to said master unit for executing two-way communication with said first antenna.

2. The apparatus according to claim 1, wherein said transceiver transmits said viewing history information received from said transmitting means to an accounting management system via said public telephone line.

3. The apparatus according to claim 1, wherein said transceiver is integrally provided in a telephone.

4. The apparatus according to claim 1, wherein said modem comprises:

modulating means for modulating said viewing history information for transmission to said transceiver.

5. The apparatus according to claim 4, wherein said modulating means transmits said viewing history information to said receiver using analog modulation.

6. The apparatus according to claim 4, wherein said modulating means transmits said viewing history information to said receiver using digital modulation.

7. The apparatus according to claim 1, wherein said pay-per-view program is subjected to a scrambling process to produce a scrambled pay-per-view new program before it is transmitted, and said receiving apparatus further comprises:

a descrambler for descrambling said scrambled pay-per-view program using a descrambling process; and control means for storing said viewing history information in said storing means in accordance with said descrambling process of said descrambler.

8. A method of transmitting viewing history information of a pay-per-view program of a digital broadcasting receiving apparatus, comprising the steps of:

reading out said viewing history information stored in a memory;

modulating said viewing history information read from said memory;

using a slave module of an analog cordless telephone with a first antenna connected thereto for transmitting said viewing history information in a wireless manner;

receiving at a second antenna connected to a master unit of the analog cordless telephone said viewing history information transmitted in said wireless manner; and transmitting said received viewing history information to an accounting management system via a public telephone line.

9. The method according to claim 8, further comprising the steps of:

descrambling a scrambled pay-per-view program using a descrambling process; and storing said viewing history information in said memory in accordance with said descrambling process.

* * * * *